US006405780B1

(12) United States Patent
Biruk

(10) Patent No.: US 6,405,780 B1
(45) Date of Patent: Jun. 18, 2002

(54) DEVICE FOR SEALING AND INFLATING TIRES

(76) Inventor: John W. Biruk, Box 114, Rte. 30 & Mill Rd., Halcottsville, NY (US) 12438

(*) Notice: Subject to any disclaimer, the term of this patent is extended or adjusted under 35 U.S.C. 154(b) by 0 days.

(21) Appl. No.: 09/897,914

(22) Filed: Jul. 5, 2001

(51) Int. Cl.⁷ ............................................... B60C 25/12
(52) U.S. Cl. ........................................ 157/1.1; 157/1.17
(58) Field of Search ................................ 157/1.1, 1.17, 157/1.2, 1.24, 7, 14, 21

(56) References Cited

U.S. PATENT DOCUMENTS

| | | | | |
|---|---|---|---|---|
| 2,849,059 A | * | 8/1958 | Bosomworth | 157/1.1 |
| 4,203,793 A | * | 5/1980 | Brodie et al. | 156/394 |
| 4,735,250 A | * | 4/1988 | Kane | 157/1.1 |
| 6,029,716 A | * | 2/2000 | Hawk | 141/38 |

* cited by examiner

Primary Examiner—Joseph J. Hail, III
Assistant Examiner—David B Thomas
(74) Attorney, Agent, or Firm—Patent & Trademark Services; Thomas Zack; Joseph H. McGlynn

(57) ABSTRACT

A device that is used to seal a tire and to inflate the seated tire. An outer chamber serves to both direct exhaust air from an inner chamber with the tire and to protect the operator. The inner chamber is connected through valves to the outer chamber which valves control to the exhaust air to the outer chamber. There also are controls to inflate the tire.

5 Claims, 1 Drawing Sheet

DEVICE FOR SEALING AND INFLATING TIRES

BACKGROUND OF THE INVENTION

This invention relates to a device that is used to seal and inflate tires with compressed air.

Devices have been used to both seal and inflate tires with a fluid, like ambient air, are well known and have been used for many years. In one earlier invention, an apparatus is disclosed that seats (seals) and inflates a tire while introducing air at super atmospheric pressure.

Another related invention discloses an apparatus for seating and inflating a tire which has a tub like housing for supporting the sidewall of the tire.

One other invention used to seat the beads of tire against the flanged rim of a vehicle wheel which also inflates the tire discloses a tub like housing for supporting the sidewall of the tire during the process.

Still another tire bead seater invention discloses an apparatus for seating and inflating tires which has a mechanism for raising the tire onto a seal rim and then inflating the tire.

DESCRIPTION OF THE PRIOR ART

Devices that seal and inflate tires with a fluid are disclosed in the known in the prior art. For example, U.S. Pat. No. 2,910,117 to Lamerson discloses an apparatus that seats and inflates a tire while introducing air at super atmospheric pressure.

U.S. Pat. No. 2,954,079 to Tarner discloses an apparatus for seating and inflating a tire which has a tub like housing for supporting the sidewall of the tire.

U.S. Pat. No. 3,366,153 to Allen is used to seat the beads of tire against the flanged rim of a vehicle wheel and also inflates the tire using a tub like housing for supporting the sidewall of the tire during the process.

U.S. Pat. No. 3,978,903 to Mueller et al. discloses a tire bead seater invention having an apparatus for seating and inflating tires which has a mechanism for raising the tire onto a seal rim and then inflating the tire.

In the present invention a device for sealing and inflating a tire has a chamber with a door that the tire is mounted on. The inner chamber is filled with pressurized air and then released causing the air within the tire to push out on its sidewalls and seat the tire, with exhaust air being being directed away from the inner chamber and operator, then the tire is inflated to the desired pressure all as will be detailed in the specification that follows hereafter.

DESCRIPTION OF THE PREFERRED EMBODIMENT

Figure 1:
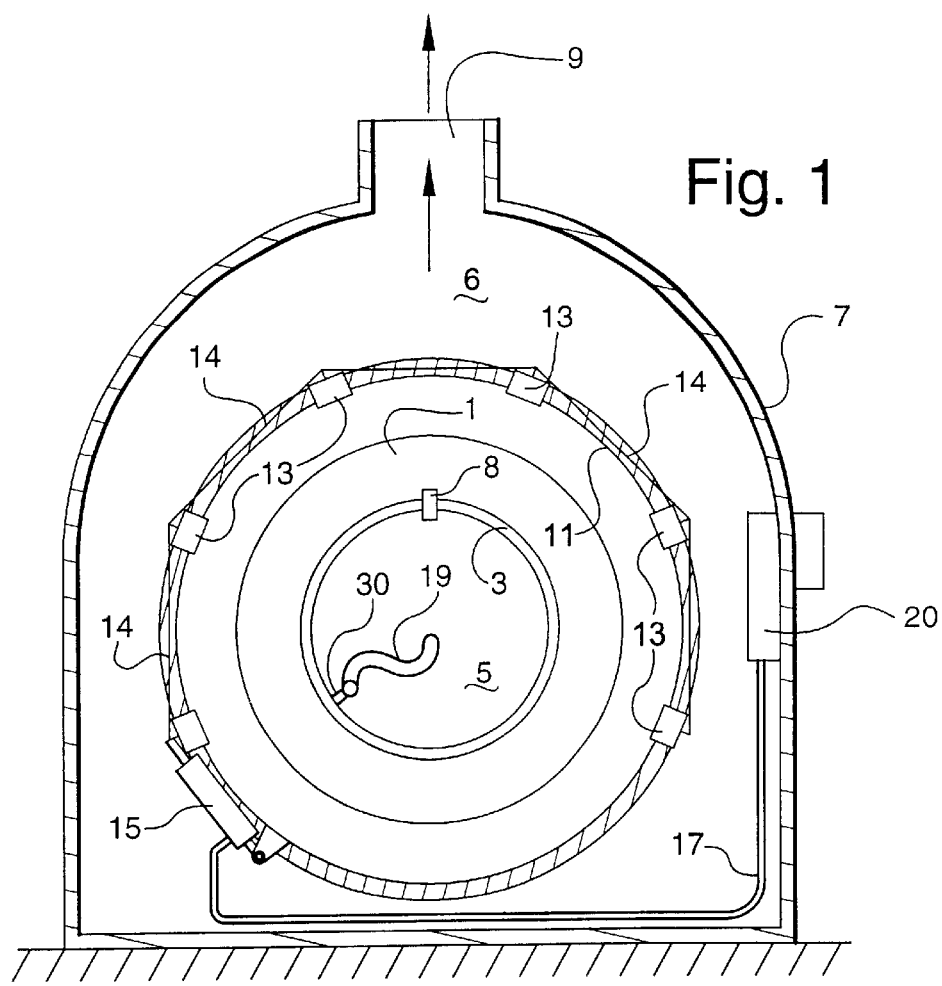
FIG. 1 is a side sectional view of the two chambers of the present invention with the front wall removed to show a tire and rim and the internal mechanisms used to seal and introduce air into the tire.

FIG. 1 is a side sectional view of the two chambers of the present invention with the front or near wall removed to show a tire 1 and rim 3 and the internal mechanisms used to seal and introduce air into the tire. The tire is a conventional tubeless inflatable tire mounted on its inner supporting rim 3 on which the tire seals. A door 5 on the back or far side of the main chamber 7, whose wall is shown in cross section, has an interior space 6 and mounts the tire to the interior of door by a door bracket 8. At the top of the chamber 7, there is an exhaust opening 9. Except for this opening, the main chamber 7 is sealable when the tire is inside and its door 5 is shut. Door 5 allows access from outside the chamber 7 to place the tire within the main chamber and an enclosed inner chamber 11, whose wall defines the inner chamber 11 and is shown in cross section. The main or outer chamber 7 serves to both direct air exhausted away from an operator during the sealing process and to protect the operator if the inflatable tire were to explode during inflation.

The inner chamber 11 is smaller than the outer chamber 7 and is a sealable to prevent the flow of air (fluid) from it. Inner chamber 11 extends around the tire 1 and the tire's rim 3 on all sides. Several openable and closable air operated valves 13 are spaced around the periphery of the inner chamber 11. Valves 13 are in communication with each other through connecting linkage rods lines 14 and also with an air cylinder 15. The air cylinder 15 functions to open and close the valves 13 to permit escaping air from the inner chamber 11 to the and outer chamber 7. An air line 17 is connected to the cylinder 15 and to a wall mounted control panel 20. By actuating the cylinder 15 with air under pressure, the valves 13 may be opened to exhaust fluid or air within inner chamber 11 to the outer chamber 7 where it flows to the exhaust opening 9. Also shown, is an air line 19 that goes from the door 5 to the conventional tire valve 30. This ladder connection allows air to be introduced into the chamber 11 and tire 1 to inflate it. As is clear, the door 5 is a door the inner chamber 11.

With the tire in the inner chamber 11, chamber 11 is initially filled with air through the air line 19 at a pressure of about 5 to 40 pounds + or − per square inch (psi). The pressure of the inner chamber is rapidly decreased and exhausted through its valves 13 to the outer chamber 7 and then to exhaust opening 9. The greater internal pressure of the inflatable tire 1 pushes outwardly on the sidewalls of the tire to seat, or seal, the tire against its supporting rim flange. The tire is next inflated, via line 19, to the desired inflation pressure typically from 80 to 120 + or − psi for a large tire, like a truck tire. It should be noted that during this inflation process valves 13 remain open in case of tire failure and the air from the outer chamber 11 is exhausted through opening 9 away from the operator. For smaller tires, like passenger vehicle tires, lesser inflation pressures (like 20 to 40 + or − psi.) would be employed with pressure differences maintained between the inner chamber 11 pressure and the internal pressure of the tire.

Figure 2:
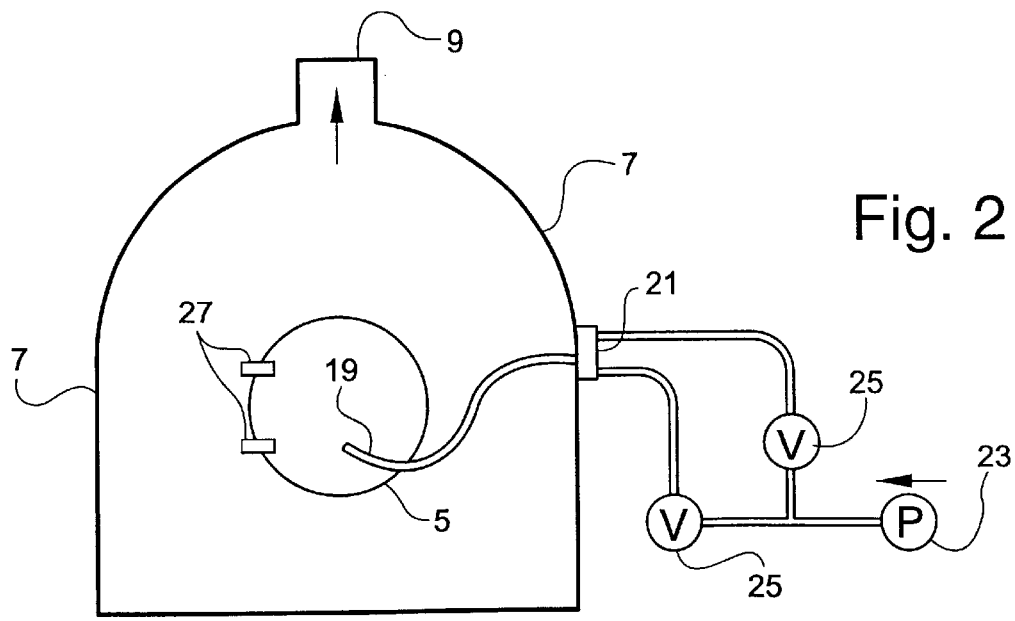
FIG. 2 is a schematic diagram of the present invention showing the outer chamber and the external portion of the control panel used to control and direct the flow of air within the inner chamber.

FIG. 2 is a schematic diagram of the present invention showing the outer inner chamber 7 and the external portion of the control panel 20 used to control and direct the flow of air within the inner chamber 11 and to inflate the tire. This view is taken from the opposite side wall of the outer chamber than that of FIG. 1 and shows the access door 5 to be approximately coextensive with the interior walls that define the inner chamber 11. There may be operator controls 21 external of the chamber to control both the internal control panel 20 of the chamber within chamber 7 and the line 19 used to supply air to inflate the tire. If desired, all of the controls for pressurized air may be on internal panel 20 communication with each other through connecting linkage rods lines 14 and also with an air cylinder 15. The air cylinder 15 functions to open and close the valves 13 to permit escaping air from the inner chamber 11 to the and outer chamber 7. An air line 17 is connected to the cylinder 15 and to a wall mounted control panel 20. By actuating the cylinder 15 with air under pressure, the valves 13 may be opened to exhaust fluid or air within inner chamber 11 to the outer chamber 7 where it flows to the exhaust opening 9. Also shown, is an air line 19 that goes from the door 5 to the conventional tire valve 21. This ladder connection allows air to be introduced into the chamber 11 and tire 1 to inflate it. As is clear,the door 5 is a door the inner chamber 11.

With the tire in the inner chamber 11, chamber 11 is initially filled with air through the air line 19 at a pressure of about 5 to 40 pounds + or − per square inch (psi). The pressure of the inner chamber is rapidly decreased and exhausted through its valves 13 to the outer chamber 7 and then to exhaust opening 9. The greater internal pressure of the inflatable tire 1 pushes outwardly on the sidewalls of the tire to seat, or seal, the tire against its supporting rim flange. The tire is next inflated, via line 19, to the desired inflation pressure typically from 80 to 120 + or − psi for a large tire, like a truck tire. It should be noted that during this inflation process valves 13 remain open in case of tire failure and the air from the outer chamber 11 is exhausted through opening 9 away from the operator. For smaller tires, like passenger vehicle tires, lesser inflation pressures (like 20 to 40 + or − psi.) would be employed with pressure differences maintained between the inner chamber 11 pressure and the internal pressure of the tire.

FIG. 2 is a schematic diagram of the present invention showing the outer inner chamber 7 and the external portion of the control panel 20 used to control and direct the flow of air within the inner chamber 11 and to inflate the tire. This view is taken from the opposite side wall of the outer chamber than that of FIG. 1 and shows the access door 5 to be approximately coextensive with the interior walls that define the inner chamber 11. There may be operator controls 21 external of the chamber to control both the internal control panel 20 of the chamber within chamber 7 and the line 19 used to supply air to inflate the tire. If desired, all of the controls for pressurized air may be on internal panel 20 and the external chamber controls 21 eliminated.

The air supply controls in the outer panel are conventional in design and may have control valves and visual indicators to both control and indicate the amount of pressurized air from an external air compressor source 23. Source 23 supplies pressurized air to the control panel. Appropriate pressure reducers and relief valves 25 external of the chamber 7 may be used if desired as further controls. The door 5, in the rear wall of chamber 7, may be mounted to the wall by hinges 27 and has internal brackets to hold tire and its rim 3 in position on the door within the chamber 11.

Normally, the tire is first mounted , and then placed on the door bracket 8 on the interior side of door 5. Using line 19 the air chuck to the tire's valve is then connected via is valve stem. The door is closed and pressurized air is supplied to the control panel or panels. A preselected amount of pressurized air is supplied to inner chamber 11 and the amount of inflated air tire pressure is selected on the panel. Next, the system is placed in a start mode to fill the chamber 11 with air pressure. Then release the chamber 11 pressure through valves 13 to chamber 7 and exhaust 9 which seals the tire to its rim. Finally, inflate the tire to a desired pressure all as previously described. During the process disclosed, appropriate air pressure differentials are employed between the internal pressure of the inflated tire 1 and pressure within the internal chamber 11 to insure these desired results.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A device for sealing and inflating a tire comprising:
    an outer chamber,
        said outer chamber having a sealable inner chamber,
        said outer chamber having an exhaust opening,
        said inner chamber having an inflatable tire mounted to a door of the inner chamber,
    exhaust valve means in air communication between the inner chamber and the outer chamber, for controlling the flow of air from the inner chamber and to the outer chamber,
        the operation of said exhaust valve being controlled by an operator control panel and cylinder, and
    an air line connected to said inflatable tire to inflate the tire to a desired pressure.

2. The device for sealing and inflating as claimed in claim 1, wherein said control valve comprises a plurality of openable and closable valves,
    said openable and closable valves being spaced about the inner chamber.

3. The device for sealing and inflating as claimed in claim 2, wherein the air line connected to the inflatable tire has its air pressure controlled by the operator control panel.

4. A method for sealing and inflating a tire comprising the steps of:
    pressurizing an inner chamber with an inflatable tire to a preselected air pressure;
    rapidly decreasing the air pressure in the inner chamber through exhaust valves,
    channeling said air pressure to an outer chamber which is connected to ambient by an exhaust opening,
    said tire having a greater inner tire pressure than the decreased pressure of the inner chamber which is sufficient to push out the tire against its supporting rim and seal the tire; and
    then, inflating the tire to a desired inflation pressure after the tire has had the tire pressure decreased to be greater than that of the pressure in the first chamber.

5. The method device for sealing and inflating as claimed in claim 4, wherein said preselected air pressure of the first chamber is between 5 to 40 pounds per square inch; and
    said inflated desired tire pressure is between 20 to 120 pounds per square inch.

* * * * *